(12) United States Patent
Baba (10) Patent No.: US 7,440,494 B2
(45) Date of Patent: Oct. 21, 2008

(54) METHOD AND SYSTEM OF BIDIRECTIONAL DATA TRANSMISSION AND RECEPTION

(75) Inventor: Junji Baba, Hadano (JP)

(73) Assignee: Hitachi, Ltd.

( * ) Notice: Subject to any disclaimer, the term of this patent is extended or adjusted under 35 U.S.C. 154(b) by 1226 days.

(21) Appl. No.: 10/222,944

(22) Filed: Aug. 15, 2002

(65) Prior Publication Data

US 2003/0043822 A1    Mar. 6, 2003

(30) Foreign Application Priority Data

Aug. 28, 2001   (JP)   ............... 2001-258202

(51) Int. Cl.
  H04L 5/14   (2006.01)
  H04L 25/49  (2006.01)
  H03B 3/00   (2006.01)
(52) U.S. Cl. ...................... 375/219; 375/257
(58) Field of Classification Search .......... 375/219, 375/220, 317, 222, 257, 259, 354; 370/276, 370/282; 398/202
See application file for complete search history.

(56) References Cited

U.S. PATENT DOCUMENTS

| | | | |
|---|---|---|---|
| 4,698,800 A * | 10/1987 | Cavaliere et al. ............. | 370/284 |
| 5,499,269 A * | 3/1996 | Yoshino ...................... | 375/257 |
| 5,801,549 A * | 9/1998 | Cao et al. ..................... | 326/83 |
| 6,304,106 B1 * | 10/2001 | Cecchi et al. ................. | 326/86 |
| 6,417,713 B1 * | 7/2002 | DeRyckere et al. ......... | 327/271 |

(Continued)

FOREIGN PATENT DOCUMENTS

JP   56-098052   1/1980

(Continued)

OTHER PUBLICATIONS

Lam et al., Simultaneous Bidirectional Signalling for IC Systems, Dept. of Electrical Engineering and Computer Science, IEEE, 1990, pp. 430-433.*

(Continued)

*Primary Examiner*—Young T. Tse
(74) *Attorney, Agent, or Firm*—Townsend and Townsend and Crew LLP (57) ABSTRACT

A simultaneous bi-directional data transferring method includes obtaining a combined signal from a portion of a data line proximate a host device. The combined signal is a signal that combines input and output signals that are being transmitted over the data line. The output signal is a signal transmitted by the host device, and the input signal is a signal transmitted by a remote device. The combined signal is provided to first and second receivers of the host device. A first fixed reference voltage is inputted to the first receiver, and a second fixed reference voltage is inputted to the second receiver. The first and second fixed reference voltages are independent of values of the output signal. A first output receiver signal is outputted from the first receiver using the first fixed reference voltage and the combined signal, and a second output signal is outputted from the second receiver using the second fixed reference voltage and the combined signal. The input signal is reproduced using the first and second output receiver signals. A length of the data line is set to enable the input signal transmitted by the remote device to arrive at an input point of the host device at an integer multiple of a clock cycle.

20 Claims, 9 Drawing Sheets

U.S. PATENT DOCUMENTS

| | | | |
|---|---|---|---|
| 6,629,250 B2 * | 9/2003 | Kopser et al. | 713/401 |
| 6,831,924 B1 * | 12/2004 | Cornett et al. | 370/419 |
| 2002/0181050 A1 * | 12/2002 | Drost et al. | 359/152 |

FOREIGN PATENT DOCUMENTS

| | | |
|---|---|---|
| JP | 03-186033 | 8/1991 |

OTHER PUBLICATIONS

Takahashi et al., 110-GB/s Simultaneous Bidirectional Transceiver Logic Synchronized with a System Clock, IEEE Journal of Solid-State Circuits, vol. 34, No. 11, Nov. 1999, pp. 1526-1533☐☐☐☐.*

Ishibashi et al., Simutaneous Bidirectional Transceiver Logic, IEEE Micro, Jan. - Feb. 1999, pp. 14-19.*

Sugai et al. "GR2000: a Gigabit Router for a Guaranteed Network," Hitachi Review 48:203-207 (1999).

* cited by examiner

| | Waveform Observed at Line_R | Rcv_R1, Rcv_R2 | Left vs. Right Relation |
|---|---|---|---|
| 142 | Left ⎯⎯⎯ Right ⎯⎯⎯ Line_R ⎯⎯⎯ Middle | Rcv_R1 ⎯⎯⎯ All'1' <br> Rcv_R2 ⎯⎯⎯ All'0' | Left_Delay+Line_Delay =Right_Delay |
| 144 | Left ⎯⎯⎯ Right ⎯⎯⎯ Line_R ⎯⎯⎯ Middle | Rcv_R1 ⎯⎯⎯ <br> Rcv_R2 ⎯⎯⎯ | Left_Delay+Line_Delay >Right_Delay |
| 146 | Left ⎯⎯⎯ Right ⎯⎯⎯ Line_R ⎯⎯⎯ Middle | Rcv_R1 ⎯⎯⎯ <br> Rcv_R2 ⎯⎯⎯ | Left_Delay+Line_Delay <Right_Delay |

| Delay Setting by Pins | | | | Set Delay Time |
|---|---|---|---|---|
| a | b | c | d | |
| 0 | 0 | 0 | 0 | 4tsel |
| 0 | 0 | 0 | 1 | 4tsel + 1tbuf |
| 0 | 0 | 1 | 0 | 4tsel + 2tbuf |
| 0 | 0 | 1 | 1 | 4tsel + 3tbuf |
| 0 | 1 | 0 | 0 | 4tsel + 4tbuf |
| 0 | 1 | 0 | 1 | 4tsel + 5tbuf |
| 0 | 1 | 1 | 0 | 4tsel + 6tbuf |
| 0 | 1 | 1 | 1 | 4tsel + 7tbuf |
| 1 | 0 | 0 | 0 | 4tsel + 8tbuf |
| 1 | 0 | 0 | 1 | 4tsel + 9tbuf |
| 1 | 0 | 1 | 0 | 4tsel + 10tbuf |
| 1 | 0 | 1 | 1 | 4tsel + 11tbuf |
| 1 | 1 | 0 | 0 | 4tsel + 12tbuf |
| 1 | 1 | 0 | 1 | 4tsel + 13tbuf |
| 1 | 1 | 1 | 0 | 4tsel + 14tbuf |
| 1 | 1 | 1 | 1 | 4tsel + 15tbuf | tsel: Delay Time per Selector Stage
tbuf: Delay Time per Buffer Stage

FIG.12

| CLK Delay Setting | Register_R | | Register_L | | Register_R | | Register_L | |
|---|---|---|---|---|---|---|---|---|
| | Reg_R1 | Reg_R2 | Reg_L1 | Reg_L2 | Reg_R1 | Reg_R2 | Reg_L1 | Reg_L2 |
| m | 1 | 0 | 1 | 0 | 1 | 0 | 1 | 0 |
| m+1 | 1 | 0 | 1 | 0 | 1 | 0 | 1 | 0 |
| m+2 | 1 | 0 | 1 | 0 | 1 | 0 | 1 | 0 |
| m+3 | 1 | 0 | 0 | 0 | 1 | 1 | 0 | 0 |
| m+4 | 1 | 0 | 0 | 0 | 1 | 0 | 1 | 0 |
| m+5 | 1 | 0 | 1 | 0 | 1 | 0 | 1 | 0 |
| m+6 | 1 | 0 | 1 | 0 | 1 | 0 | 1 | 0 |
| m+7 | 1 | 0 | 1 | 0 | 1 | 0 | 1 | 0 |
| m+8 | 1 | 0 | 1 | 0 | 1 | 0 | 1 | 0 |
| m+9 | 1 | 0 | 1 | 0 | 1 | 0 | 1 | 0 |
| m+10 | 1 | 0 | 1 | 0 | 1 | 0 | 1 | 0 |
| m+11 | 1 | 0 | 1 | 1 | 0 | 0 | 1 | 1 |
| m+12 | 1 | 0 | 1 | 0 | 1 | 0 | 1 | 0 |
| m+13 | 1 | 0 | 1 | 0 | 1 | 0 | 1 | 0 |
| m+14 | 1 | 0 | 1 | 0 | 1 | 0 | 1 | 0 |
| m+15 | 1 | 0 | 1 | 0 | 1 | 0 | 1 | 0 |
| | Before Delay Setting | | | | After Delay Setting | | | |

METHOD AND SYSTEM OF BIDIRECTIONAL DATA TRANSMISSION AND RECEPTION

CROSS-REFERENCES TO RELATED APPLICATIONS

The present application relates to and claims priority from Japanese Patent Application No. 2001-258202, filed on Aug. 28, 2001.

BACKGROUND OF THE INVENTION

The present invention relates to simultaneous bi-directional data transfer over data lines.

Data transmission and reception techniques enabling simultaneous bi-directional signal transmission and reception over a single data line have heretofore been known, for example, those described in JP-A-98052-1981 and JP-A-186033-1991. A simultaneous bi-directional data transfer technology involves transmitting and receiving data signals simultaneously over the same data line. In JP-A-98052-1981, the output of a transmitter in a transceiver at one station is connected via a resistor to the data line that carries the output signal to another station having a similar transceiver. In addition, the output signal from the transmitter passes through a resistor, is combined with a base voltage, and is input to a differential receiver as a reference voltage. The signal transmitted over the data line is input to a differential receiver. In this previous technique, the differential receiver filters out the output signal generated by the home station and reproduces the input signal received from the remote station.

In JP-A-186033-1991, after signals transmitted by two stations are combined by signal combining means, signal separation means separates the combined signal into an output signal of the home station and an input signal of the remote station. The home station filters out the output signal and allows the input signal from the remote station to be inputted and processed by the circuits in the home station.

Figure 2:
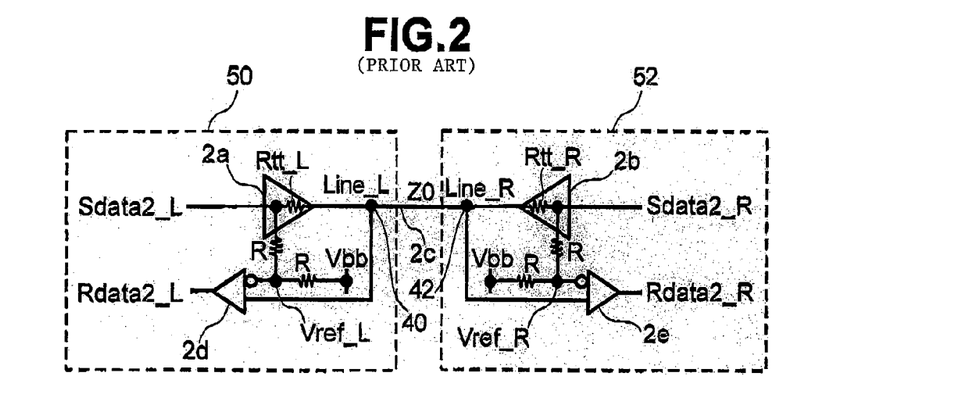
FIG. 2 is a block diagram showing the structure of conventional bi-directional data TX/RX circuitry.
Figure 3:
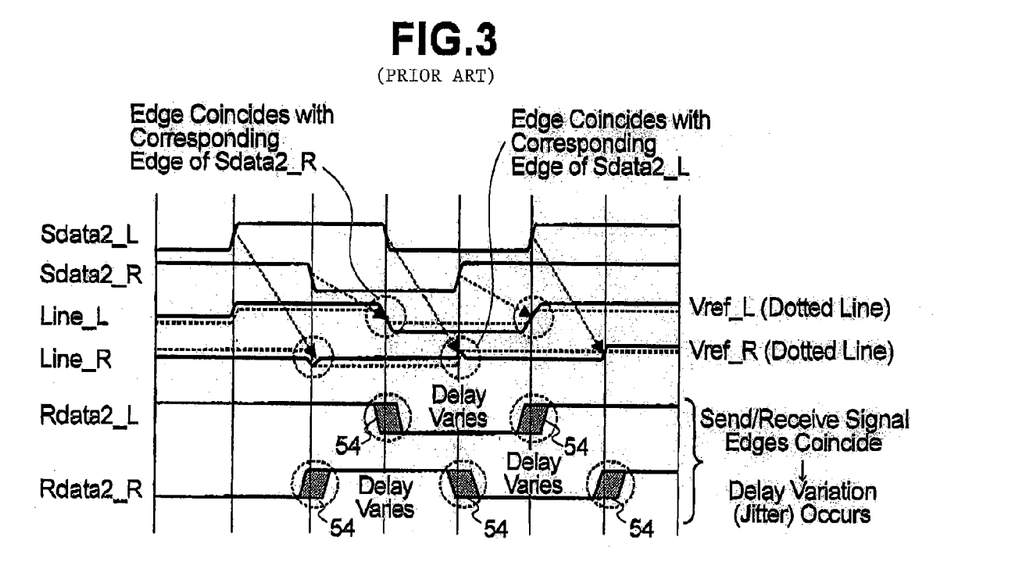
FIG. 3 is a timing chart of signals transmitted and received by the circuitry shown in FIG. 2.
Figure 4:
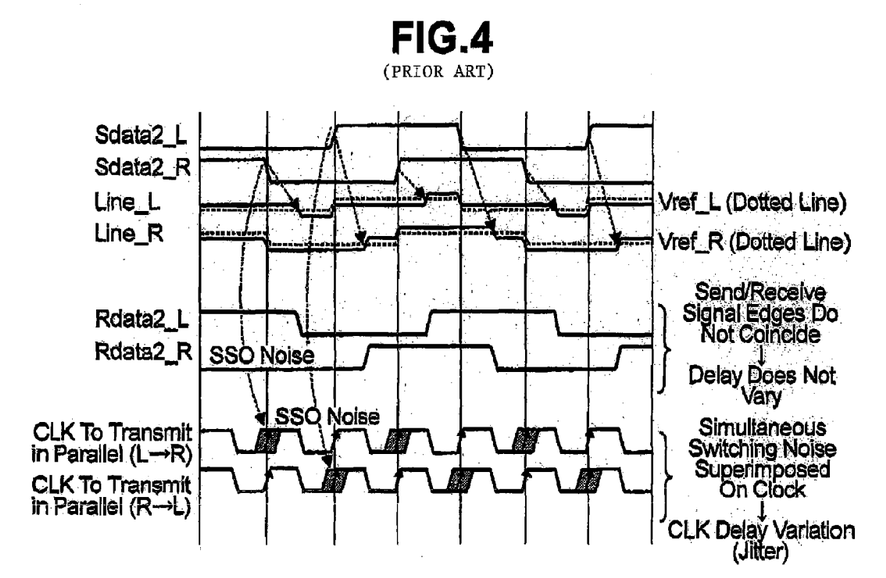
FIG. 4 is a timing chart of the signals in which delay control is exerted so that the corresponding edges of send/receive signals do not coincide.

FIG. 2 is a block diagram showing the structure of bi-directional data transceiver at each station configured according to conventional techniques. FIG. 3 is a timing chart of signals transmitted and received at an input point 40 (Line_L) of the circuitry shown in FIG. 2, at where the rising and falling edges of an input signal received from the remote station (remote device) coincide with the corresponding edges of an output signal of the home station (host device). FIG. 4 is a timing chart of the above signals in which delay control is exerted, so that the corresponding edges of input and output signals do not coincide. In FIG. 2, numerals 2a and 2b denote transmitters, numeral 2c denotes a data line, and numerals 2d and 2e denote differential receivers.

As used herein, the host device refers to a device including a circuit or component being discussed, and the remote device refers to a device that is transmitting an input signal to the host device. Generally, the description provided herein uses the device on the left side as the reference point. Accordingly, the device on the left side is generally referred to as either "host device" or "home station," and the device on the right side is generally referred to as either "remote device" or "remote station." However, these terms are used merely for illustrative purposes and should not be used to limit the scope of the invention.

The bi-directional data transceiver in FIG. 2 supplies a variable reference voltage to the differential receiver. That is, the reference voltage Vref_L is obtained by combining a constant voltage with the output signal of the transmitter. Therefore, the reference voltage is dependent on the output signal. A transceiver 50 includes a transmitter 2a and a differential receiver 2d. A transceiver 52 includes a transmitter 2b and a differential receiver 2e. A data line 2c couples the two transceivers 50 and 52.

In the transceiver 50, the transmitter 2a outputs send data Sdata2_L via a resistor Rtt_L to the data line 2c. In the transceiver 52, the transmitter 2b outputs send data Sdata2_R via a resistor Rtt_R to the data line 2c. The resistances of the resistors Rtt_L and Rtt_R are set equally at characteristic impedance Zo of the data line 2c. The send data Sdata2_L and Sdata2_R output by the transmitters 2a and 2b are combined on the data line into a signal having three states or voltage levels: H, H/2, L.

A voltage source Vbb in the transceiver 50 is set at potential that is one half the amplitude level of the output signal of the transmitter 2a, namely, H/2. When a "0" signal is output from the transmitter 2a, a reference voltage Vref_L that is input to the differential receiver 2d will be a quarter of the amplitude of the output signal from the transmitter 2a, namely, H/4. When a "1" signal is output, the reference voltage Vref_L will be three quarter, namely, 3H/4. As a result, the differential receiver 2d compares the reference voltage Vref_L and the triple-valued voltage signal transmitted over the data line 2c, cancels only the output signal transmitted by the host device, and reproduces the input data received from the remote device, thereby obtaining the receive data Rdata2_L as the input data from the remote device. The transceiver 52 including the transmitter 2b and the differential receiver 2e at the remote device performs similar operations. The simultaneous bi-directional data transfer technology is also described in U.S. Pat. No. 5,499,269, which is incorporated by reference.

The transceivers 50 and 52 can implement bi-directional data handling operations without problem if the corresponding edges of the signals transmitted by both host and remote devices do not coincide at the input point 40 or 42. However, such a situation frequently occurs in data transfer operations as illustrated in FIG. 3 unless specific precautions are taken. The falling and rising edges of the signals with respect to Line_L and Line_R are marked with circles.

FIG. 3 illustrates the voltage signal waveforms of the send data Sdata2_L of the transmitter 2a and the send data Sdata2_R of the remote transmitter received respectively at the input points 40 and 42 of the differential receivers 2d and 2e. FIG. 3 also illustrates the receive data Rdata2_L and the Rdata2_R at the input points 40 and 42. In addition, dotted lines denote the reference voltages Vref_L and Vref_R. Assume that the Sdata2_R signal output from the transmitter 2b of the right-hand station or device 52 is delayed by time "t" as it travels over the data line 2c and arrives at the input point 40 of the differential receiver on the left-hand station (host device or home station) when the falling edge of the Sdata2_R signal coincides with the falling edge of the Sdata2_L signal output from the host device 50.

At this time, the fall time of the signal Sdata2_R from the transmitter 2b of the device 52 becomes slow when it has arrived at the input point 40 of the differential receiver 2d of the host device. This falling edge coincides with the falling edge of the signal Sdata2_L output from the host device 50. Consequently, the Sdata2_R signal level changes from H to L without transition to ½H level. On the other hand, the reference voltage Vref_L sharply changes from 3H/4 to H/4.

As a result, the differential receiver 2d has difficulty in comparing the reference voltage Vref_L and the triple-valued voltage signal transmitted over the data line 2c for a period (indicated by a shaded portion 54) because of the difference between the fall time of the reference signal and that of the signal transmitted over the data line. This causes a delay variation, e.g., a temporary signal processing error during when it is difficult to determine the state of the signal. The above phenomenon also occurs at the rising edges of the input and output signals.

Accordingly, the transceivers 50 and 52 use delay control mechanisms to prevent the corresponding edges of the signals from coinciding. The delay variation resulting from the edge coinciding occurs in the receive circuit because there is a difference between the fall or rise time of the reference voltage signal that is input to the differential receiver and that of the signal transmitted over the data line as described above. Rise or fall time of the input signal at the home station becomes slow as a result of the line resistance and parasitic capacitance of the data line and the input capacitance of the receiver. On the other hand, the reference voltage of the home station does not experience such a delay so it changes fast from H/4 to 3H/4 or 3H/4 to H/4. Thus, when these two signals with different fall or rise time are input to the differential receiver, the receiver cannot compare them properly due to the jitter in the falling and rising edges.

To avoid the above-described problem, a delay control mechanism is applied to prevent the corresponding edges of signals from coinciding. FIG. 4 shows a timing chart of the signals for which delay control is exerted. As shown in FIG. 4, if coincidence of the corresponding edges of input and output signals is avoided at the input point, a delay variation does not occur in the receive circuit. Thus, the above problem described can be solved. However, a new problem arises.

As shown in FIG. 4, the timing at which both stations transmit data differs by a half cycle from the timing shown in FIG. 3, and delay control is exerted to prevent the corresponding edges of input and output signals from coinciding. As a result, the clock timing to receive a signal from the remote device, for example, the rising timing of CLK to transmit in parallel (L–>R) shown in FIG. 4, coincides with the timing to transmit a signal from the host device. When the home station transmits a signal, multiple parallel signals rise or fall simultaneously (since home station has many transceivers), resulting in fluctuation of the current flowing across the line. This current fluctuation produces simultaneous switching output (SSO) noise.

In other words, if multiple signal bits change in synchronization with the timing of level change of the Sdata2_L and Sdata2_R, the SSO noise may be added to the signal-receiving clock signals. This noise contributes to the deterioration of the waveform quality of the clock signals. Therefore, the delay control mechanism that does not add the SSO noise to the clock signals is needed when the circuitry shown in FIG. 2 is used.

BRIEF SUMMARY OF THE INVENTION

With rapid popularization of the Internet in recent years, information-processing devices such as computers and network devices such as routers are required to operate at higher speed. To achieve higher speed operation of these devices, means for increasing operating frequencies or extending bit width have been explored. Communication devices, e.g., ASICs and LSIs, used in the information processing devices and network devices are designed to operate faster and faster and provided with increasing numbers of pins.

However, it is desirable to use less pins in the communication devices for cost reduction. Accordingly, the above-described simultaneous bi-directional device can be applied to reduce the number of data signal pins provided on the semiconductor communication device by half. The problems described above, however, needs to be solved to effectively implement the simultaneous bi-directional data transfer technology.

In one embodiment, a device configured to provide simultaneous bi-directional data transfer includes a transceiver. The transceiver includes a transmitter to transmit an output signal to a data line, first and second receivers, and a selector. The first receiver has first and second input nodes. The first input node of the first receiver is configured to receive a first fixed reference voltage, and the second input node of the first receiver is configured to receive a combined signal from the data line. The combined signal is a signal resulting from combining the output signal of the transmitter and an input signal from a remote device. The second receiver has first and second input nodes. The first input node of the second receiver is configured to receive a second fixed reference voltage, and the second input node of the second receiver is configured to receive the combined signal from the data line. The selector includes an output node and first, second, and third input nodes. The first input node of the selector is configured to receive a signal output by the first receiver. The second input node of the selector is configured to receive the output signal. The third input node is configured to receive a signal output by the second receiver. The output node of the selector is configured to output the input signal received from the remote device that has been reproduced by the selector.

In another embodiment, a communication system is configured to provide simultaneous bi-directional data transfer. The system includes a first device comprising n number of transceivers configured to provide simultaneous bi-directional data transfer. A second device comprises n number of transceivers configured to provide simultaneous bi-directional data transfer. N-number of data lines are coupled to the transceiver of the first device with the transceiver of the second device.

Each one of the n numbers of the transceivers in the first device comprises a transmitter to transmit an output signal to one of the n data lines. A first receiver has first and second input nodes. The first input node of the first receiver is configured to receive a first fixed reference voltage, and the second input node of the first receiver is configured to receive a combined signal from the one of the n data lines. The combined signal is a signal that combines the output signal of the transmitter and an input signal to the transceiver transmitted by a transceiver of the second device. A second receiver has first and second input nodes. The first input node of the second receiver is configured to receive a second fixed reference voltage, and the second input node of the second receiver is configured to receive the combined signal from the data line. A selector includes an output node and first, second, and third input nodes. The first input node of the selector is configured to receive a signal output by the first receiver, the second input node of the selector is configured to receive the output signal, the third input node of the selector is configured to receive a signal output by the second receiver. The selector is configured to reproduce the input signal from the second device and output the reproduced input signal via the output node of the selector.

In anther embodiment, a communication circuit is configured to provide simultaneous bi-directional data transfer over a data line. The circuit includes a transmitter to transmit an output signal to the data line. A first receiver has first and second input nodes. The first input node of the first receiver is configured to receive a first fixed reference voltage, and the second input node of the first receiver is configured to receive a combined signal from the data line. The combined signal is a signal resulting from combining the output signal of the transmitter and an input signal from a remote device. The combined signal is a triple-valued signal. A second receiver has first and second input nodes. The first input node of the second receiver is configured to receive a second fixed reference voltage, and the second input node of the second receiver is configured to receive the combined signal from the data line. A selector includes an output node and first, second, and third input nodes. The first input node of the selector is configured to receive a signal output by the first receiver. The second input node of the selector is configured to receive the output signal. The third input node of the selector is configured to receive a signal output by the second receiver. The output node of the selector is configured to output a signal representing the input signal received from the remote device.

In yet another embodiment, a method of transmitting and receiving data simultaneously over a data line connecting first and second stations includes providing the data line with a given length so that a signal transmitted from the first station reaches the second station after a signal delay time that is an integral multiple of a clock cycle of signal transfer.

In yet another embodiment, a simultaneous bi-directional data transferring method includes obtaining a combined signal from a portion of a data line proximate a host device. The combined signal is a signal that combines input and output signals that are being transmitted over the data line. The output signal is a signal transmitted by the host device and the input signal is a signal transmitted by a remote device. The combined signal is provided to first and second receivers of the host device. A first fixed reference voltage is inputted to the first receiver, and a second fixed reference voltage is inputted to the second receiver. The first and second fixed reference voltages are independent of values of the output signal. A first output receiver signal is outputted from the first receiver using the first fixed reference voltage and the combined signal, and a second output signal is outputted from the second receiver using the second fixed reference voltage and the combined signal. The input signal is reproduced using the first and second output receiver signals.

DETAILED DESCRIPTION OF THE INVENTION

Figure 1A:
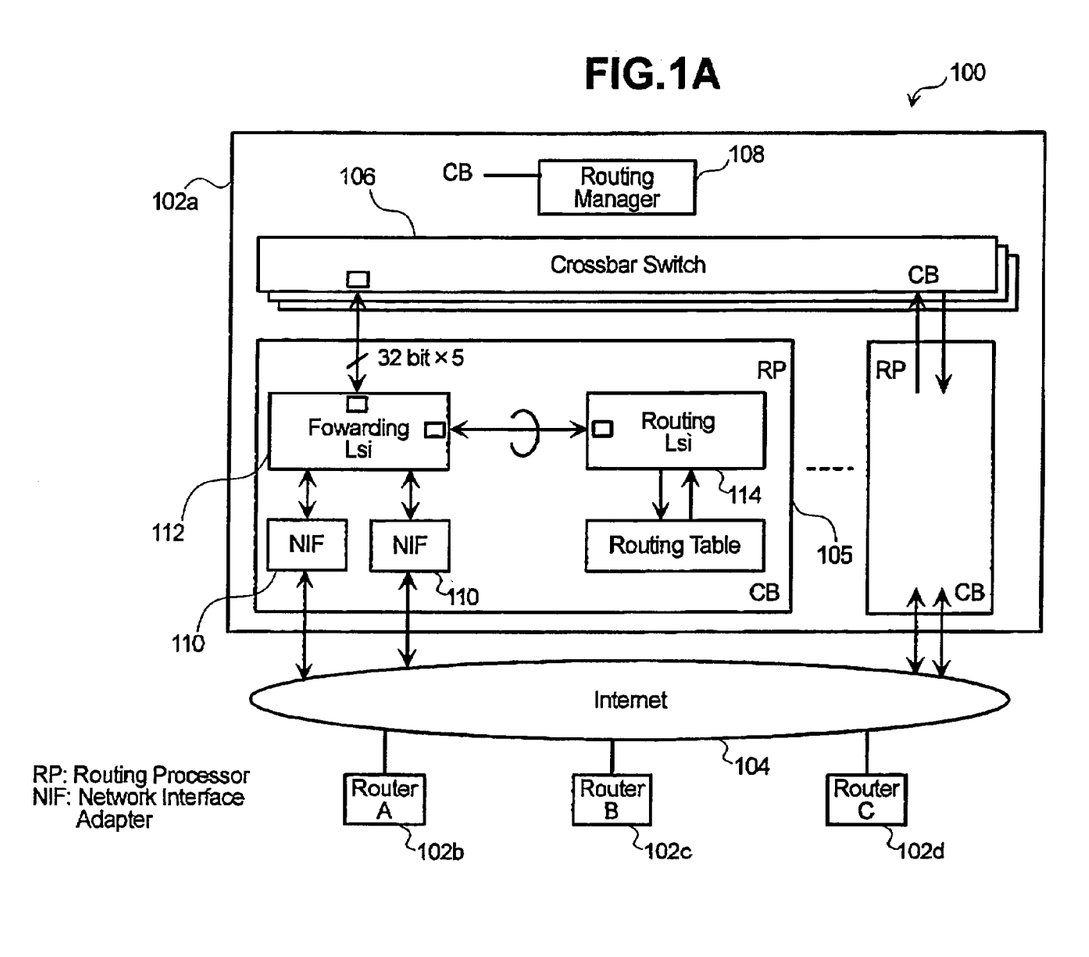
FIG. 1A is a block diagram of a router including a plurality of bi-directional data communication devices according to one embodiment of the present invention.

FIG. 1A illustrates a network system 100 including a plurality of routers 102a-102d and a network 104, e.g., the Internet, linking the routers. The routers may have substantially the same or different configurations. The router 102a is described herein as a representative router.

The router 102a includes a plurality of routing processors 105 that includes various components used to communicate with other routers 102, a plurality of crossbar switches 106 that transfer data received from one point to another point (e.g., from one routing processor to another routing processor) in the router, and a routing manager 108 that provides information needed by the switches 106 to transfer data.

The routing processor 105 includes one or more network interface cards or adapters (NTFs) 110 that receive and transmit data to and from the network 104, a forwarding device 112, and a routing device 114. The forwarding device 112 forwards data received from the NIF 110 to the crossbar switch 106 and that received from the switch 106 to the NIF 110. The routing device 114 provides the forwarding device 112 with the information as to where to forward the data. The forwarding and routing devices 112 and 114 are generally application specific integrated circuits (ASICs) or large scale integrated circuits (LSIs) that are formed on semiconductor substrates. Detailed description of the router architecture is omitted herein since it is well known by those skilled in the art.

Figure 1B:
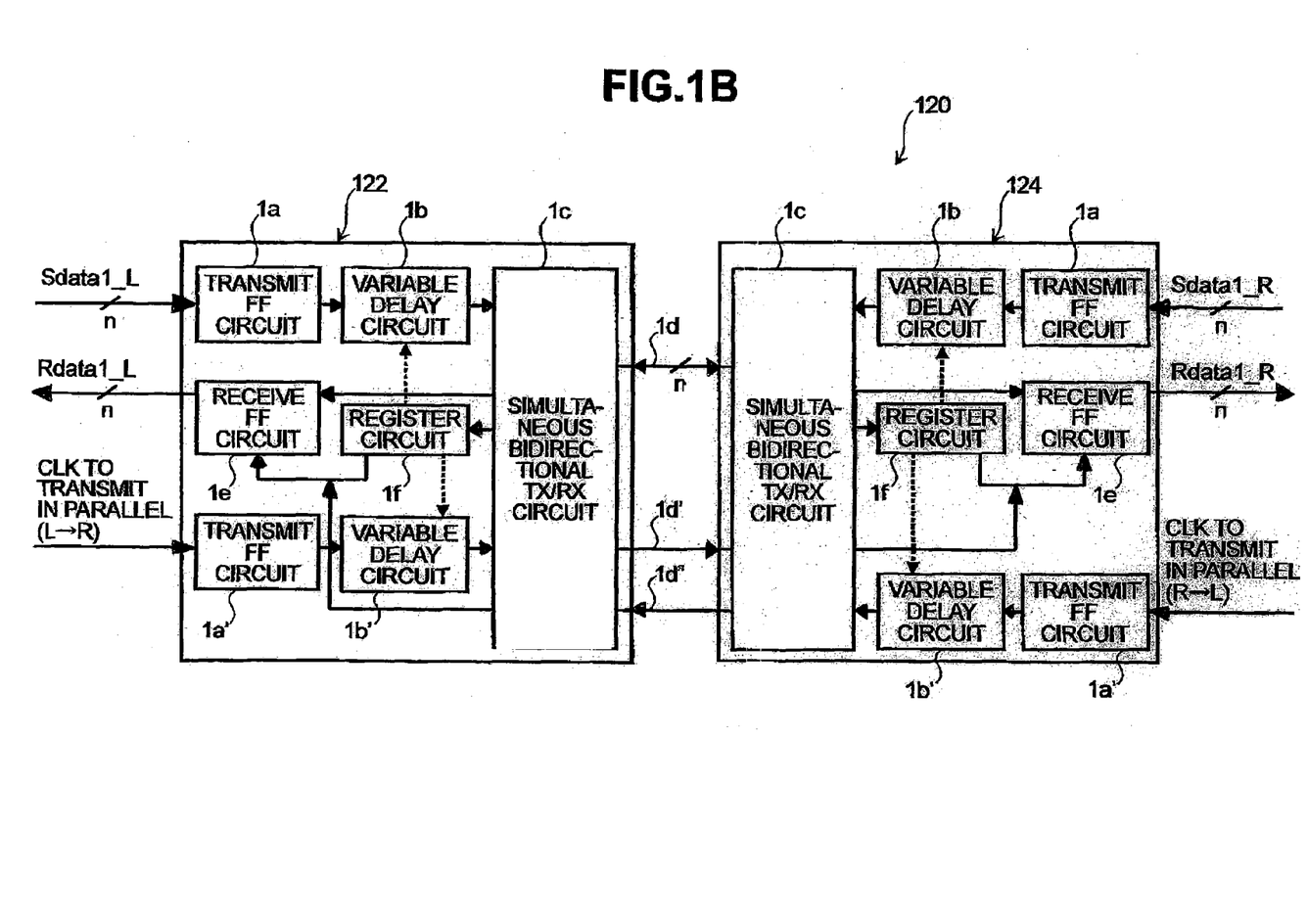
FIG. 1B is a block diagram showing the structure of a system of bi-directional data transmission and reception configured according to one embodiment of the present invention.

FIG. 1B is a block diagram showing the structure of a bi-directional communication system 120 including data interfaces 122 and 124 according to one embodiment of the present invention. The data interfaces 122 and 124 are provided in communication devices, such as, the forwarding device 112 and the routing device 114. They may also be provided in the crossbar switch 106 and the routing manager 108. The data interfaces 122 and 124 are also referred to as home and remote interfaces, left and right stations, or home or remote stations.

In FIG. 1B, numerals 1a and 1a' denote transmit flip-flop (FF) circuits, numerals 1b and 1b' denote variable delay circuits, a numeral 1c denotes a bi-directional TX/RX circuit, numerals 1d, 1d' and 1d" denote signal lines, a numeral 1e denotes a receive flip-flop (FF) circuit, and a numeral 1f denotes a register circuit.

In the illustrative system shown in FIG. 1B, the host and remote devices are provided with n-bit data lines, a line 1d' for clock signals from the left to right stations, and a line 1d" for clock signals from the right to left stations. In one embodiment, the n-bit of data lines represent 160 lines, and the bi-directional communication system 120 is capable of transmitting 560 Mbs. The signal lines 1d, 1d', and 1d" connecting the left and right stations are configured to be of equal length. The output signal travels through the transmit FF circuit 1a, the variable delay circuit 1b, and the bi-directional data TX/RX circuit 1c. The transmitter of the TX/RX circuit on the host device transmits the output signal over the n-bit data lines 1d. The output signal experiences some delay as it travels over the data line 1d and arrives at the receive circuit of the bi-directional data TX/RX circuit 1c of the remote device. The receive circuit transfers the data to the receive FF circuit 1e. The receive FF circuit 1e receives the data in synchronization with signal-receiving clock signals traveling in a separate route: from the transmit FF circuit 1a'-> variable delay circuit 1b', -> bi-directional data TX/RX circuit 1c-> data line 1d'-> bi-directional data TX/RX circuit 1c. The register circuit 1f stores result output (e.g., see FIG. 12) from the receive circuit in the bi-directional data TX/RX circuit 1c for use in providing an appropriate delay time to the output signal. The bi-directional data TX/RX circuit 1c receives both input data from the remote device and output data from the host device and filters out the output data to reproduce the input data from the remote device.

Figure 5:
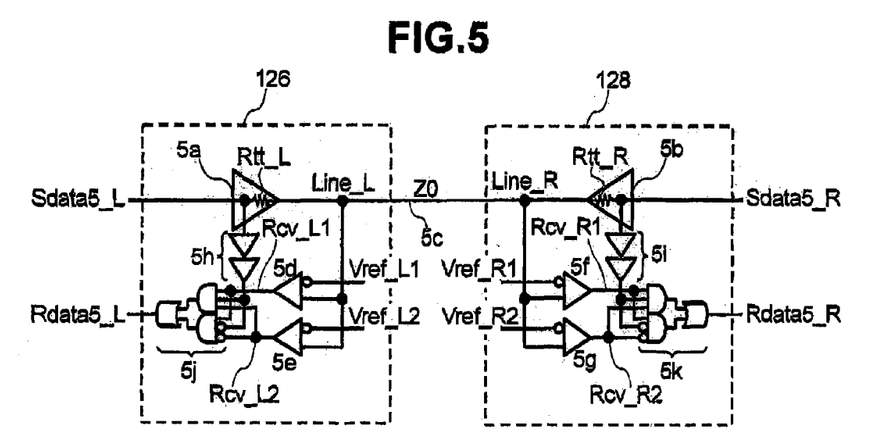
FIG. 5 is a block diagram showing the structure of bi-directional data TX/RX circuitry configured according to one embodiment of the present invention.
Figure 6:
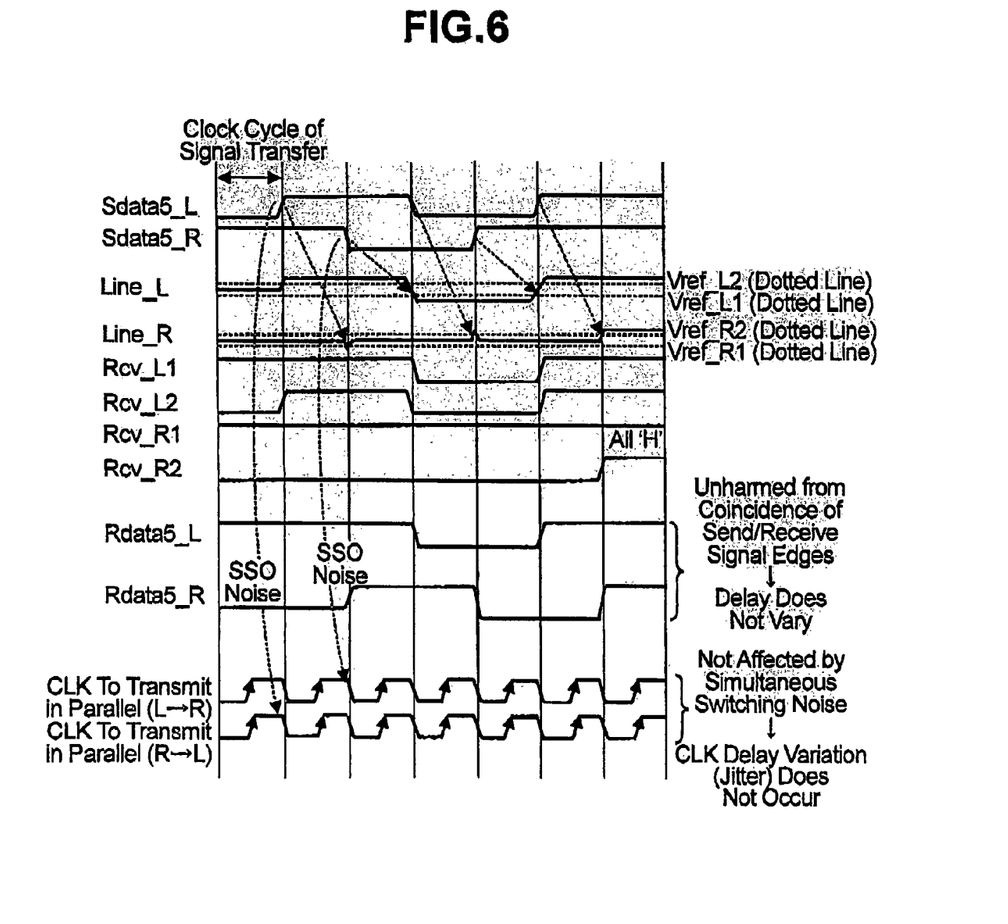
FIG. 6 is a timing chart of signals transmitted and received by the circuitry shown in FIG. 5 for explaining the circuit operation.

FIG. 5 is a block diagram showing configurations of transceivers 126 and 128 included in the bi-directional TX/RX circuitry 1c of FIG. 1B according to one embodiment of the present invention. The transceivers 126 and 128 are configured to receive and transmit 1 bit of data. As used herein below, the term "transceiver" is generally used to refer one of a plurality of circuits provided within the TX/RX circuitry. Accordingly, the TX/RX circuitry that is configured to receive and transmit n-bits simultaneously includes n number of transceivers. FIG. 6 is a timing chart of signals transmitted and received by the transceivers in FIG. 5. In FIG. 5, numerals 5a and 5b denote transmitters, numeral 5c denotes data line, numerals 5d to 5g denote differential receivers, numerals 5h and 5i denote delay adjusting circuits, and numerals 5j and 5k denote selectors.

The transmitters 5a and 5b of the transceivers 126 and 128 have similar configuration as those illustrated in FIG. 2 according to one embodiment of the present invention. However, in the present embodiment, each of the transceivers 126 and 128 have a plurality of differential receivers (numerals 5d and 5e for the transceivers 126 and numerals 5f and 5g for the transceivers 128) for receiving a triple-valued voltage signal (H, H/2, and L) transmitted over the data line 5c. In the transceiver 126 on the left side, reference voltages Vref_L1 and Vref_L2 having fixed potentials are supplied to the differential receivers 5d and 5e, respectively. The reference voltages are directly applied to the differential receivers so they are not affected by the changes in the output signal, contrary to the conventional technology. That is, they are independent of the output signal. The differential receivers 5d and 5e receive signals having triple values. The output signals of the host device are transferred to the selector circuit 5j via the delay adjusting circuit 5h. Thereafter, the selector circuit 5j filters out the output signal from the triple-valued signal received from the differential receivers 5d and 5e to obtain the receive data (or input data) Rdata5_L. A similar operation is performed on the transceiver 128 on the right side to obtain the receive data Rdata5_R.

The circuit components shown in FIG. 5 that operate as described above transmit and receive signals as illustrated in the time chart in FIG. 6. Because of fixed reference voltage signal input to each differential receiver in the circuitry shown in FIG. 5, the problem due to fall or rise time difference is eliminated and signal jitter does not occur in the differential receivers.

The transceivers 126 and 128 use the data line 5c that is provided with a specific length, so that the signal delay from the host device to the remote device is such that an output signal arrives at the remote device at a time equal to an integral multiple of a clock cycle. As a result, the simultaneous switching output (SSO) noise is prevented from being superimposed to the signal-receiving clock signals. Setting the data line length to make delay equal to an integral multiple of a clock cycle of signal transfer causes the corresponding edges of input and output signals to coincide. However, the signal jitter does not occur in the receive circuits because fixed reference voltages are applied to the differential receivers. Accordingly, the SSO noise generation timing and signal-receiving clock timing can be made asynchronous.

In another embodiment, the input and output signals from the host and remote devices are transmitted with an offset. However, the delay induced by the data line should be set so that the corresponding edges of an input signal from a remote device and an output signal from a host device coincide at the input point of the differential receiver of the host device. For example, timing at which one device transmits signals is delayed by a half cycle relative to the timing at which the other device transmits signals. Then, the delay of signals traveled over the data line will be an integral multiple of a clock cycle of signal transfer plus 0.5 cycle, and the corresponding edges of the input and output signals coincides at the input point 40 to the receive circuit of the home station.

As illustrated above, the transceivers 126 and 128 can be used to avoid both delay variation or signal processing errors in the receive circuit resulting from the coincidence of the corresponding edges of input and output signals and the superimposition of the SSO noise to the clock signals.

A method of correcting delay variation between the communication devices using a variable delay circuit is described below.

Figure 7:
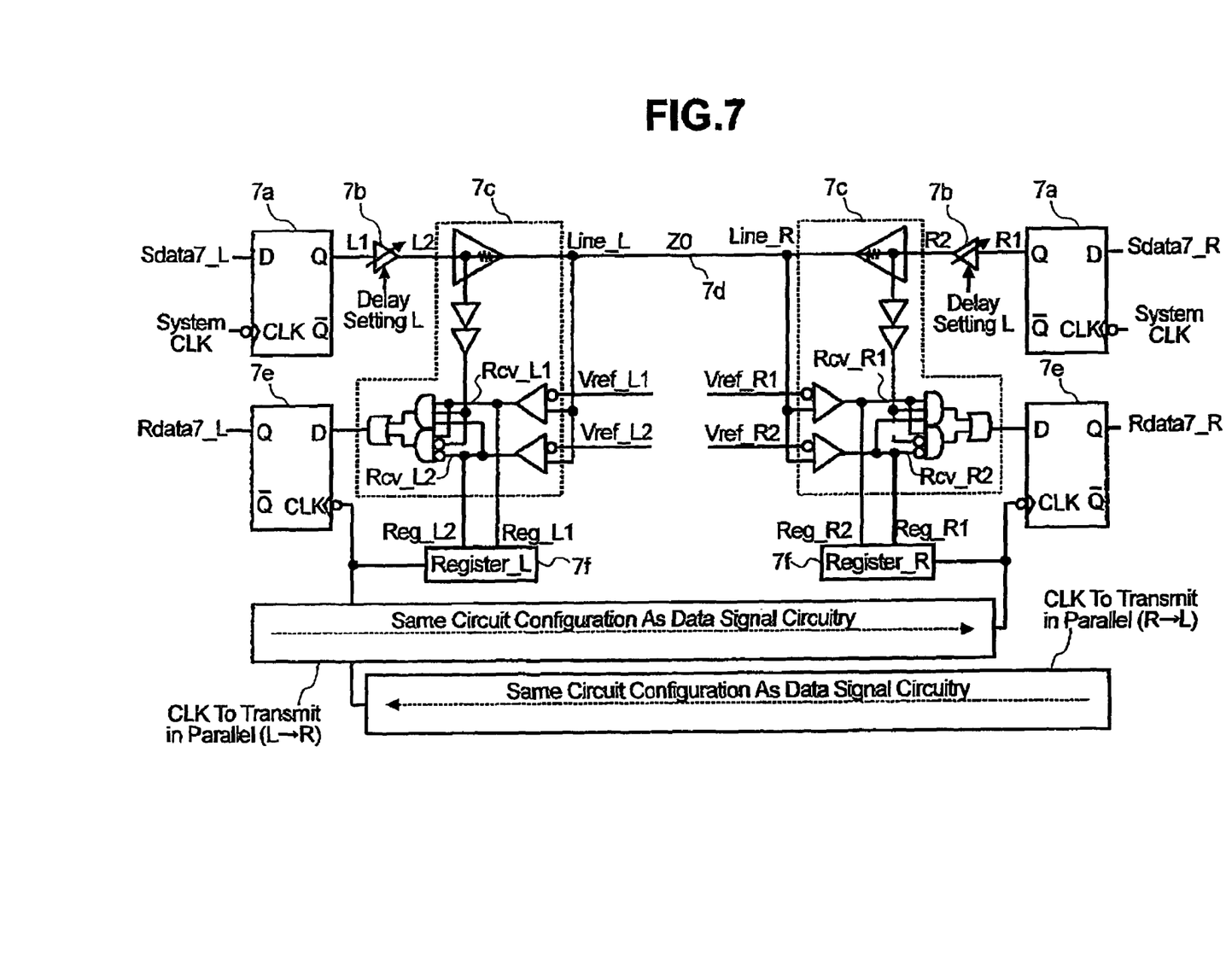
FIG. 7 is a block diagram showing exemplary circuitry structure for detecting and correcting difference by delay variation between the LSIs, using a typical one of the n bits of data.
Figure 8:
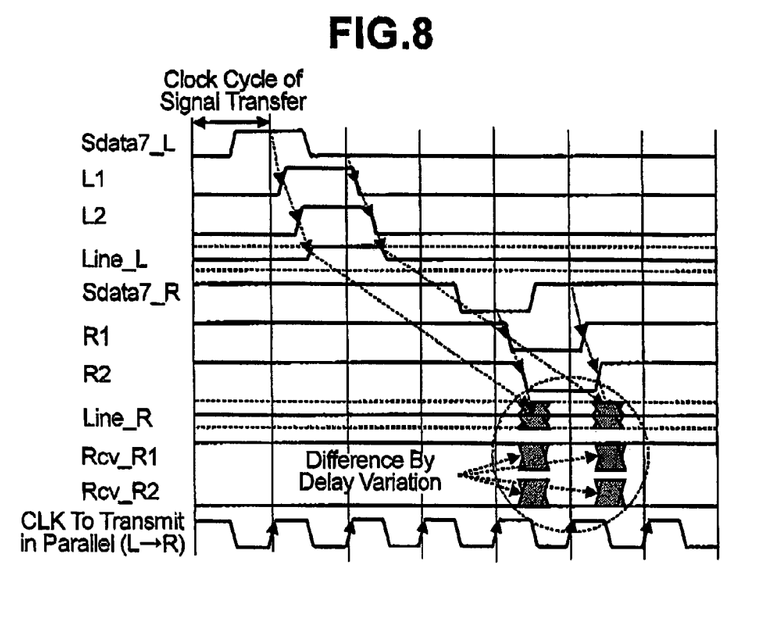
FIG. 8 is a timing chart of signals transmitted and received by the circuitry shown in FIG. 7 for explaining the circuit operation.

FIG. 7 depicts a block diagram of components of communication devices involved in detecting and correcting delay variation according to one embodiment of the present invention. The circuits in FIG. 7 are used to handle a single bit so the communication devices have n number of such circuits. FIG. 8 is a timing chart of signals transmitted and received by the circuitry shown in FIG. 7. In FIG. 7, a numeral 7a denotes a transmit FF circuit, a numeral 7b denotes a variable delay circuit, a numeral 7c denotes a transceiver, a numeral 7d denotes a data line, a numeral 7e denotes a receive FF circuit, and a numeral 7f denotes a register circuit. The transmit FF circuit 7a, variable delay circuit 7b, receive FF circuit 7e, and register circuit 7f correspond to the transmit FF circuit 1a, variable delay circuit 1b, receive FF circuit 1e, and register circuit 1f in FIG. 1B, respectively.

In the circuitry shown in FIG. 7, the variable delay circuits 7b at both the left and right stations are provided first with an intermediate delay value. For the transceiver for signal-receiving clock signals (to transmit in parallel), which have similar configuration as the data signal circuitry of the transceiver 7c, the variable delay circuits are provided with at an intermediate delay value. The delay values are provided an intermediate value since the delay can be set either longer or shorter, relative to the value.

Then, the transmit FF circuit 7a transmits a string of data of known value (e.g., "01000000" in the time chart in FIG. 8), one of the bits containing a different value than the other bits, as an output data Sdata7_L from the left station. The output data Sdata7_L is delayed as it travels across the host device and over the data line (e.g., by three clock cycles of signal transfer in the illustrative case shown in FIG. 8) and arrives at an input point Line_R of the differential receiver of the remote device. The remote device transmits data Sdata7_R to the host device, delayed by three cycles relative to the send data transmission from the left station, so that the data Sdata7_R coincides with the signal from the left station. The Sdata7_R data has a string bits that are inverse of the bits of Sdata7_L, for example, string "11110111" is applied. The first three bits are provided to compensate for the delay.

As a result, if there is no delay variation in the communication devices and the data line, the data Sdata7_L and the data Sdata7_R meet at the input point Line_R and the potential at the input point Line_R will be a half the H level of signal (an intermediate value of the triple-valued voltage levels). However, "0" or "1" signals actually appear at the Line_R point, affected by the delay variations in the communication devices and the data line, according to the variation range, as shown in the circle drawn with a dotted line in FIG. 8.

Figure 9:
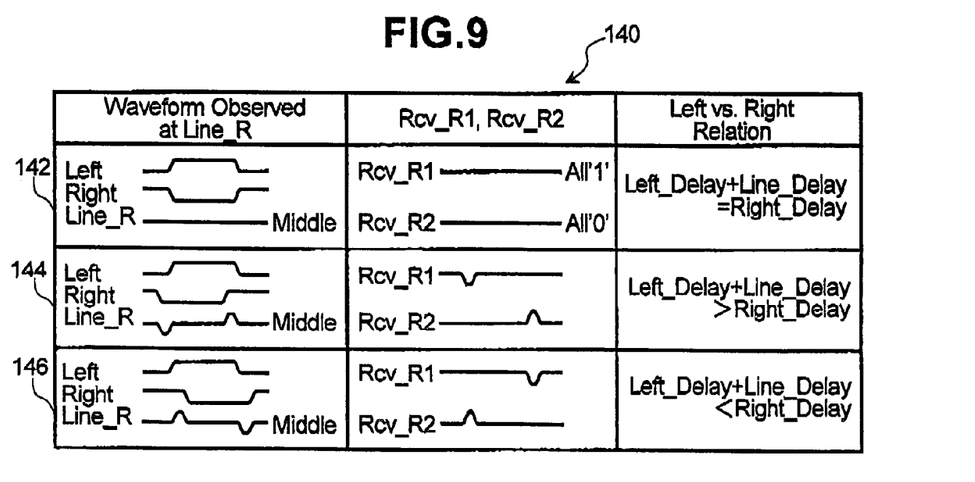
FIG. 9 provides a table for explaining what waveform patterns appears according to comparison between the combination of delay variations in the distant LSI and the data line and the delay variation in the home LSI.

FIG. 9 provides a table 140 for explaining what waveform patterns appear according to comparison between the combination of delay variations in the remote device and the data line and the delay variation in the host device. The table in FIG. 9 shows possible voltage signal waveforms that may appear at the input point Line_R and the output points of the differential receivers in FIG. 7. The table also shows a comparison between a combination of delay variations in the host and remote devices and in the data line. A row 142 of the table 140 depicts exemplary waveforms where the delay variation in the left device+ the delay variation in the data line=the delay variation in the right device. A row 144 illustrates exemplary waveforms where the delay variation in the left device+ the delay variation in the data line is greater than the delay variation in the right device. A row 146 illustrates exemplary waveforms where the delay variation in the left device+ the delay variation in the data line is smaller than delay variation in the right device. The values of the Rcv_R1 and Rcv_R2 signals shown in the middle column of the table 140 are stored into the register circuit 7f and are used for delay control by the variable delay circuit 7b when actual data reception is subsequently performed by software.

Figure 10:
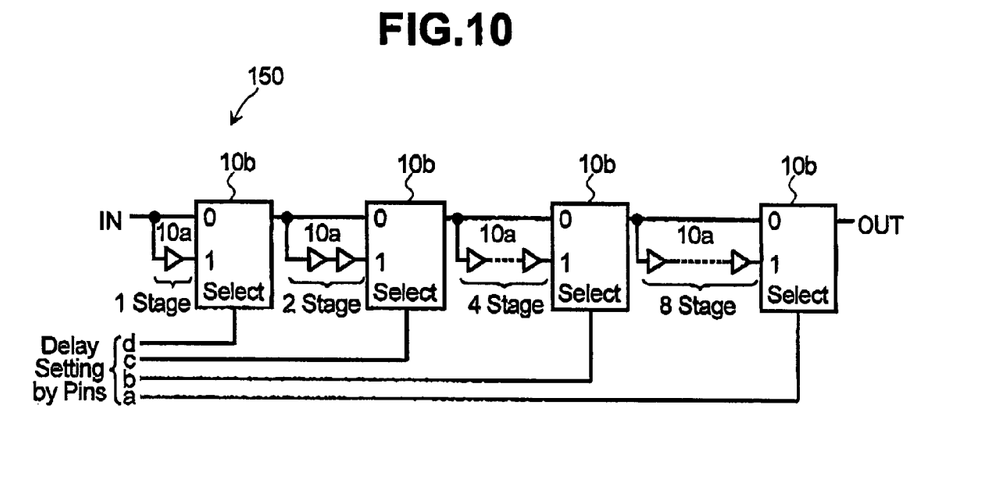
FIG. 10 is a block diagram showing an exemplary variable delay circuit configuration.
Figure 11:
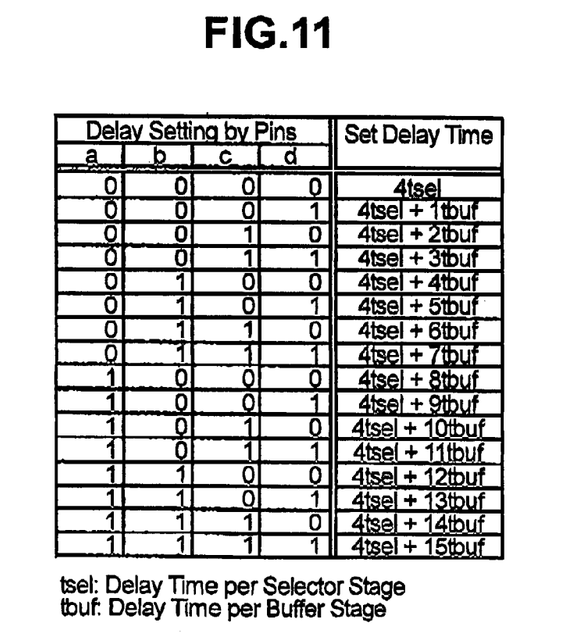
FIG. 11 provides a table for explaining the characteristics of the variable delay circuit shown in FIG. 10.
Figure 12:
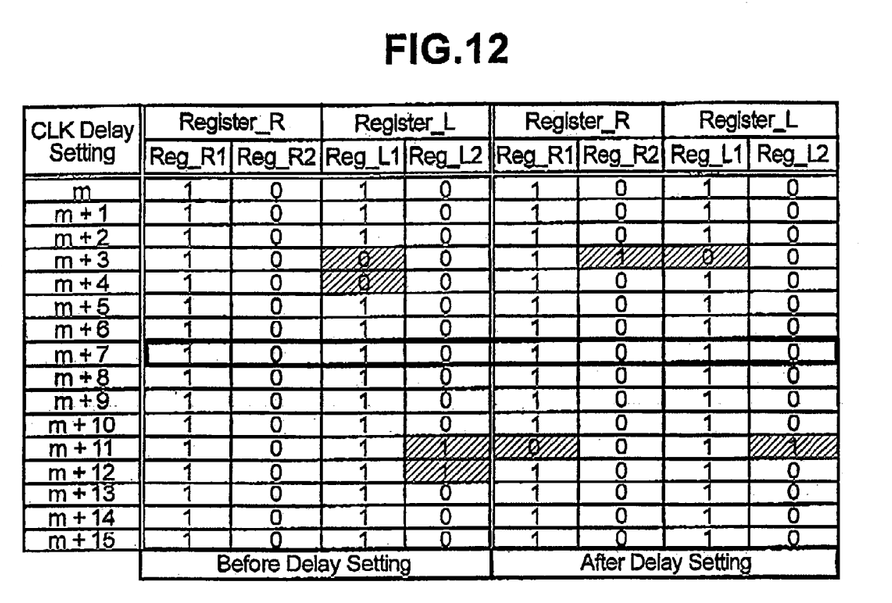
FIG. 12 provides a table for explaining exemplary result values of detecting delay variation using the circuitry shown in FIG. 7, which have been stored into the register circuit.

FIG. 10 is a block diagram showing an exemplary configuration of the variable delay circuit 150. FIG. 11 provides a table for explaining the characteristics of the variable delay circuit shown in FIG. 10. FIG. 12 provides a table for explaining exemplary result values of detecting delay variation using the circuitry shown in FIG. 7, which have been stored into the register circuit. In FIG. 10, numeral 10a denotes a buffer and numeral 10b denotes a selector.

The variable delay circuit 150 is comprised of four selectors 10b and buffers 10a located on the input line to each selector 10b, where the selectors and buffers are connected in series. Specifically, one stage, two stages, four stages, and eight stages of buffers 10a are connected in series to the input of the first, second, third, and fourth selectors, respectively. Arbitrary delay values are input to the selectors using delay setting pins a, b, c, and d as inputs connected to each selector, thereby obtaining values shown in the table in FIG. 11.

For example, by assigning values such that a=0, b=1, c=1, d=0, the variable delay circuit shown would provide a delay of four stages of selectors+two stages of buffers+four stages of buffers. Additional selectors may be added to the circuit 150 to provide additional delay time. Storing values into the register circuit 7f is performed sequentially by incrementing the set values on the variable delay circuit for signal-receiving clock signals (to transmit in parallel). The values of Rcv_R1 and Rcv_R2 are stored into Reg_R1 and Reg_R2 respectively. On the host device, a similar operation as described above is performed, and the values of Rcv_L1 and Rcv_L2 are stored into Reg_L1 and Reg_L2 respectively.

After a series of operations described above, data is stored into the register circuit as exemplified in the table in FIG. 12. The table shows that difference by delay variation lies in the data in the shaded fields. In this example, the values stored in the registers_R show no difference by delay variation, whereas the values stored in the registers_L show difference by delay variation. This can take place, for example, when the host device has longer delay, the data line has shorter delay, and the remote device has no delay variation. This example indicates that there is a little time margin between data signal level change timing (simultaneous switching timing) and signal-receiving clock timing at the host device. Therefore, the variable delay circuit should be set to shorten the delay in the host device and store the new delay values of the variable delay circuit into the register circuit again.

The above delay adjustment operation is repeated to provide the registers with the values specified in the right-hand columns of the table shown in FIG. 12, labeled "after delay setting." Eventually, the values on the variable delay circuit for signal-receiving clock signals are set as specified in the boldly framed fields in the table shown in FIG. 12 (the values balancing the timing margins ahead of and behind clock timing).

While bit string "01000000" transmitted from the host device and bit string "11110111" transmitted from the remote device were used in this embodiment, other bit strings may be used for purposes of the present embodiment. In the example above, predetermined, known bit strings are used for detecting and correcting delay variation between the communication devices; however, other methods may be used to compensate the delay.

The system 120 of the present embodiment in FIG. 1B commences actual data transfers after a delay setting have been performed to correct the delay variation between the communication devices. Accordingly, the system 120 can avoid the signal processing errors resulting from the coincidence of the corresponding edges of the input and output signals and the superimposition of the SSO noise to the signal-receiving clock signals, thereby enabling high-speed data communication.

Figure 13:
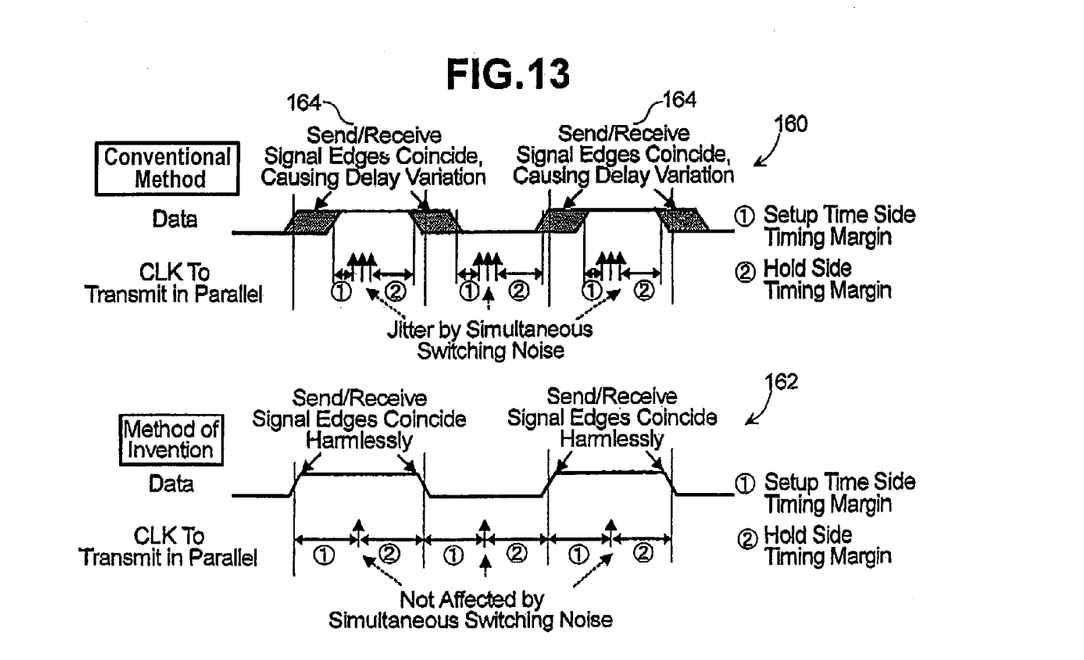
FIG. 13 is a timing chart of typical signal waveforms for comparison between previous technique and the preferred embodiment of the present invention.

FIG. 13 is a timing chart of the signal waveforms comparing the conventional technique and the present embodiment of the present invention. As seen in FIG. 13, in the case of a conventional method, a timing margin or window is reduced because of delay variation or skew in the receive circuit due to the coincidence of the corresponding edges of the input and output signals and the superimposition of the SSO noise onto the signal-receiving clock signals. A signal waveform 160 represents a timing chart of a conventional technique, and a signal waveform 162 represents a timing chart of an embodiment of the present invention. The signal waveform 160 is provided with signal noise/skew portions 164 that reduce the timing window; however, such a portion is not present in the signal waveform 162 of the embodiment of the present invention.

In the bi-directional TX/RX method of the preferred embodiment of the invention, as described above, the corresponding edges of send/receive signals coincide at the input point to the receive circuit, but this does not cause jitter in the receive circuit. To prevent jitter, a fixed voltage of reference signal is input to the receive circuit and the data line length is set so that an output signal form a communication device arrives at an input point of another communication device at a time equaling an integral multiple of a clock cycle. In one embodiment, the delay difference between the two communications is detected by using the variable delay circuit and receive circuit for clock signals and corrected by using the variable delay circuit for data signals. Furthermore, the delay setting on the variable delay circuit for clock signals is set within time allowed for settling a signal level.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A device configured to provide simultaneous bi-directional data transfer, the device comprising:
   a transceiver including:
   a transmitter to transmit an output signal to a data line,
   a first receiver having first and second input nodes, the first input node of the first receiver being configured to receive a first fixed reference voltage and the second input node of the first receiver being configured to receive a combined signal from the data line, the combined signal being a signal resulting from combining the output signal of the transmitter and an input signal from a remote device,
   a second receiver having first and second input nodes, the first input node of the second receiver being configured to receive a second fixed reference voltage and the second input node of the second receiver being configured to receive the combined signal from the data line, and
   a selector including an output node and first, select, and second input nodes, the first input node of the selector being configured to receive a signal output by the first receiver, the select input node of the selector being configured to receive the output signal as a select signal via a delay adjusting circuit, the second input node of the selector being configured to receive a signal output by the second receiver, the output node of the selector being configured to output the input signal received from the remote device that has been reproduced by the selector,
   wherein the selector selects the input signal received from the remote device by the select signal and outputs the input signal received from the remote device to the output node of the selector.

2. The device of claim 1, further comprising:
   a variable delay circuit coupled to the transmitter to provide the output signal with a predetermined delay time to prevent a signal processing error.

3. The device of claim 2, further comprising:
   a register coupled to the variable delay circuit and configured to store values that are used by the variable delay circuit to adjust the predetermined delay time.

4. The device of claim 1, wherein a potential of the first fixed reference voltage applied to the first receiver is not affected by changes in the potential of the output signal.

5. The device of claim 1, wherein the device includes a plurality of transceivers that are configured to handle simultaneous bi-directional data transfer with the remote device.

6. The device of claim 1, wherein the device is a semiconductor communication device.

7. The device of claim 1, wherein the device is a routing processor in a router and the remote device is a switch in the router.

8. A communication system configured to provide simultaneous bi-directional data transfer of n-bit data, the system comprising:
   a first device comprising n number of transceivers configured to provide simultaneous bi-directional data transfer;
   a second device comprising n number of transceivers configured to provide simultaneous bi-directional data transfer; and
   n number of data lines coupling the transceivers of the first device with the transceivers of the second device,
   wherein each one of the n numbers of the transceivers in the first device comprises:
   a transmitter to transmit an output signal to one of the n data lines,
   a first receiver having first and second input nodes, the first input node of the first receiver being configured to receive a first fixed reference voltage and the second input node of the first receiver being configured to receive a combined signal from the one of the n data lines, the combined signal being a signal that combines the output signal of the transmitter and an input signal to one transceiver of the first device transmitted by one transceiver of the second device,
   a second receiver having first and second input nodes, the first input node of the second receiver being configured to receive a second fixed reference voltage and the second input node of the second receiver being configured to receive the combined signal from one of the n data lines, and
   a selector including an output node and first, select, and second input nodes, the first input node of the selector being configured to receive a signal output by the first receiver, the select input node of the selector being configured to receive the output signal as a select signal via a delay adjusting circuit, the second input node of the selector being configured to receive a signal output by the second receiver, the selector being configured to reproduce the input signal from the second device and output the reproduced input signal via the output node of the selector,
   wherein the selector selects the input signal received from the second device by the select signal and outputs the input signal received from the second device to the output node of the selector.

9. The system of claim 8, wherein the system is a router including a routing processor, wherein the first device is a forwarding device provided in the routing processor and the second device is a routing device provided in the routing processor.

10. The system of claim 8, wherein the first device further comprises:
    a variable delay circuit coupled to the transmitter and configured to provide the output signal with a predetermined delay time to prevent a signal processing error.

11. The system of claim 10, further comprising:
    a register coupled to the variable delay circuit and configured to store values that are used by the variable delay circuit to adjust the predetermined delay time.

12. The system of claim 8, wherein a potential of the first and second fixed reference voltages applied to the first and second receivers are not affected by changes in the potential of the output signal.

13. A communication circuit configured to provide simultaneous bi-directional data transfer over a data line, the circuit comprising:
    a transmitter to transmit an output signal to the data line;
    a first receiver having first and second input nodes, the first input node of the first receiver being configured to receive a first fixed reference voltage and the second input node of the first receiver being configured to receive a combined signal from the data line, the combined signal being a signal resulting from combining the output signal of the transmitter and an input signal from a remote device, the combined signal being a triple-valued signal;

a second receiver having first and second input nodes, the first input node of the second receiver being configured to receive a second fixed reference voltage and the second input node of the second receiver being configured to receive the combined signal from the data line; and a selector including an output node and first, select, and second input nodes, the first input node of the selector being configured to receive a signal output by the first receiver, the select input node of the selector being configured to receive the output signal as a select signal via a delay adjusting circuit, the second input node of the selector being configured to receive a signal output by the second receiver, the output node of the selector being configured to output a signal representing the input signal received from the remote device, wherein the selector selects the input signal received from the remote device by the select signal and outputs the input signal received from the remote device to the output node of the selector.

14. The communication circuit of claim 13, further comprising:

a variable delay circuit coupled to the transmitter and configured to provide the output signal with a predetermined delay time.

15. The communication circuit of claim 14, further comprising:

a register coupled to the variable delay circuit and configured to store values that are used by the variable delay circuit to adjust the predetermined delay time.

16. A simultaneous hi-directional data transferring method, comprising:

obtaining a combined signal from a portion of a data line proximate a host device, the combined signal being a signal that combines input and output signals that are being transmitted over the data line, the output signal being a signal transmitted by the host device and the input signal being a signal transmitted by a remote device;

providing the combined signal to first and second receivers of the host device;

inputting a first fixed reference voltage to the first receiver and a second fixed reference voltage to the second receiver, the first and second fixed reference voltages being independent of values of the output signal;

outputting a first output receiver signal from the first receiver using the first fixed reference voltage and the combined signal and a second output receiver signal from the second receiver using the second fixed reference voltage and the combined signal; and reproducing the input signal using the first and second output receiver signals.

17. The method of claim 16, further comprising:

providing the output signal to a selector to which the first and second output receiver signals are being inputted, wherein the selector reproduces the input signal using the output signal via a delay adjusting circuit and the first and second output receiver signals.

18. The method of claim 16, further comprising:

experimentally determining an appropriate delay time for the output signal by transmitting a data string of known value prior to transmitting the output data.

19. The method of claim 16, wherein a length of the data line is set to enable the input signal transmitted by the remote device to arrive at an input point of the host device at an integer multiple of a clock cycle.

20. The method of claim 16, wherein a length of the data line is set such that a delay time between receiving the output signal and receiving the input signal is an integer multiple of a clock cycle of signal transfer.

* * * * *